US012365105B2

(12) United States Patent
Zhang

(10) Patent No.: US 12,365,105 B2
(45) Date of Patent: Jul. 22, 2025

(54) MARKING PEN WITH UNPACKING KNIFE

(71) Applicant: CHINA FIRST PENCIL CO., LTD., Shanghai (CN)

(72) Inventor: Bingyang Zhang, Shanghai (CN)

(73) Assignee: CHINA FIRST PENCIL CO., LTD., Shanghai (CN)

( * ) Notice: Subject to any disclaimer, the term of this patent is extended or adjusted under 35 U.S.C. 154(b) by 287 days.

(21) Appl. No.: 18/133,039

(22) Filed: Apr. 11, 2023

(65) Prior Publication Data

US 2023/0330876 A1 Oct. 19, 2023

(30) Foreign Application Priority Data

Apr. 19, 2022 (CN) ......................... 202220909136.4

(51) Int. Cl.
*B26B 11/00* (2006.01)
*B26B 1/08* (2006.01)
*B43K 29/18* (2006.01)

(52) U.S. Cl.
CPC ................ *B26B 11/00* (2013.01); *B26B 1/08* (2013.01); *B43K 29/18* (2013.01)

(58) Field of Classification Search
None
See application file for complete search history.

(56) References Cited

U.S. PATENT DOCUMENTS 2,141,061 A * 12/1938 Dodson .................. B26B 11/00 30/162
4,180,909 A * 1/1980 Lind ......................... B26B 5/00 D7/650
5,269,062 A * 12/1993 Dallaire ................ B26B 21/446 30/535
6,276,014 B1 8/2001 Lee
6,554,163 B1 4/2003 Kaye
7,155,829 B1 * 1/2007 Sun ......................... B26B 5/003 30/162

(Continued)

FOREIGN PATENT DOCUMENTS

FR 2598346 A1 11/1987
JP 2001171284 A 6/2001

(Continued)

OTHER PUBLICATIONS

English translation of KR 2020190000088-U, dated Jan. 9, 2019.*

(Continued)

*Primary Examiner* — Hwei-Siu C Payer
(74) *Attorney, Agent, or Firm* — Cooper Legal Group, LLC

(57) ABSTRACT

The present application relates to a marking pen with an unpacking knife, which includes knife box fixed with the penholder, a first sliding groove is defined on an outer wall of the knife box, a sliding knife is slidably connected in the knife box, a driving rod is fixed on a sidewall of the sliding knife, the driving rod is slidably connected in the first sliding groove, a knife opening is provided on the outer wall of the knife box, the knife opening is in communication with an inner chamber of the knife box, a limiting block is fixed on an inner wall of the first sliding groove, an outer wall of the limiting block is configured to abut against an outer wall of the driving rod, and the knife box is provided with a driving member for driving the driving rod to slide.

10 Claims, 3 Drawing Sheets

(56) References Cited

U.S. PATENT DOCUMENTS

| | | | | |
|---|---|---|---|---|
| 7,296,316 | B1 | 11/2007 | Wu | |
| 2003/0028973 | A1* | 2/2003 | Johnson | B26B 5/003 7/160 |
| 2005/0150116 | A1 | 7/2005 | Johnson et al. | |
| 2007/0193689 | A1* | 8/2007 | Haemerle | B26B 5/00 156/510 |
| 2007/0261174 | A1 | 11/2007 | Barker | |
| 2014/0173912 | A1* | 6/2014 | Scimone | B26B 1/00 30/162 |

FOREIGN PATENT DOCUMENTS

| | | | |
|---|---|---|---|
| JP | 2008296030 | A | 12/2008 |
| KR | 20110137021 | A * | 12/2011 |
| KR | 2020190000088 | | 1/2019 |
| WO | 2005002876 | A1 | 1/2005 |

OTHER PUBLICATIONS

English translation of KR 10-2011-0137021 A, dated Dec. 22, 2011.*

First Office Action cited in corresponding Japanese patent Application No. 2023-064529, dated Jan. 16, 2024, 8 pages.

European Search Report of Corresponding Application EP 23167832; Sep. 29, 2023; 4 pages.

European Communication in Corresponding Application EP 23167832; Oct. 11, 2023; 5 pages.

* cited by examiner

MARKING PEN WITH UNPACKING KNIFE

CROSS-REFERENCE TO RELATED APPLICATION

This application claims the priority and benefit of Chinese patent application serial no. 202220909136.4, filed on Apr. 19, 2022. The entirety of Chinese patent application serial no. 202220909136.4 is hereby incorporated by reference herein and made a part of this specification.

TECHNICAL FIELD

The present application relates to a field of unpacking knife and in particular relates to a marking pen with an unpacking knife.

BACKGROUND ART

With the development of the society, online shopping becomes increasingly popular. People can remain within doors to buy the required goods. The goods shopped online are delivered by express. The operator generally packs the goods by using the tapes to enclose the opening of the package, in order to increase the safety of the goods during transportation. When the operator packs the goods, it is required to sign on the outer wall of the package, and the tape is required to be cut off after the package is enclosed.

The existing marking pen with the unpacking knife includes a penholder and a knife box integrated with the penholder. A sliding knife is slidably connected in the inner chamber of the knife box. The sidewall of the sliding knife is integrated and fixed with a driving rod. An end of the driving rod away from the sliding knife is positioned out of the knife box. A knife opening is provided through the sidewall of the knife box. The knife box is provided with a sliding groove on the outer sidewall thereof. The driving rod is slidably connected in the sliding groove. The operator drives the driving rod to slide in the sliding groove, so as to realize the sliding of the sliding knife. When the sharp end of the sliding knife is slid out from the knife opening, the sharp end can cut the goods in the external environment.

In view of the above related technology, the inventor found that the operator needed to push the driving rod continuously when cutting the goods by using the above marking pen with unpacking knife, so that the driving knife abuts against the inner wall of the sliding groove and the cutting of the marking pen with unpacking knife is more stable. The manner of continuous pushing the driving rod brings inconvenience to operator, which is urgent for improvement.

SUMMARY

The present application provides a marking pen with an unpacking knife, in order to make the cutting process of the sliding knife more stable, and to reduce the inconvenience to the operator during cutting.

The marking pen with an unpacking knife provided in the present application adopts the following technical solution.

A marking pen with an unpacking knife includes a penholder and a knife box fixed with the penholder, a first sliding groove is defined on an outer wall of the knife box, a sliding knife is slidably connected in the knife box, a driving rod is fixed on a sidewall of the sliding knife, the driving rod is slidably connected in the first sliding groove, a knife opening is defined on the outer wall of the knife box, the knife opening is in communication with an inner chamber of the knife box, a limiting block is fixed on an inner wall of the first sliding groove, an outer wall of the limiting block is configured to abut against an outer wall of the driving rod, and the knife box is provided with a driving member for driving the driving rod to slide.

By adopting the above technical solution, the operator drives the driving rod to slide in the first sliding groove when it is required to cut the goods in the external environment by using the sliding knife. The driving rod drives the sliding knife to slide in the knife box. When the sharp end of the sliding knife is slid out from the knife opening, the limiting rod abuts against the sidewall of the driving rod. The arrangement of the limiting block can limit the sliding of the driving rod, so that the sliding knife has a better stability when the operator cuts the goods in the external environment, so as to reduce the interruption for operator during cutting.

Optionally, a second sliding groove is defined on the outer wall of the knife box, the first sliding groove is positioned on an outer surface of the second sliding groove, the driving member includes a driving block fixed on an end of the driving rod away from the sliding knife, and the driving block is slidably connected in the second sliding groove.

By adopting the above technical solution, the operator pushes the driving block to slide in the second sliding groove, so as to drive the driving rod to slide, the arrangement of the second sliding groove makes the sliding of the sliding block smoother.

Optionally, a blocking block is provided on the outer surface of the second sliding groove, an arc transition portion is provided between the blocking block and the outer surface of the second sliding groove, and a side of the blocking block away from the second sliding groove is configured to abut against the sidewall of the driving block.

By adopting the above technical solution, the outer wall of the blocking block abuts against the side of the driving block facing the knife box when the sharp end of the sliding knife is slid out from the knife opening. The arrangement of the blocking block limits the sliding of the driving block, so that the cutting of the sliding knife is more stable.

Optionally, the sidewall of the driving rod along a thickness direction is configured as an arc transition.

By adopting the above technical solution, the arc transition plays a guiding role on the sliding of the driving rod, so that it is more convenient for the operator to push the driving rod to slide, reducing the stuck possibility between the limiting block and the driving rod.

Optionally, a plurality of reinforced plates are fixed on the inner wall of the penholder in homogeneous spacing, and each of the plurality of reinforced plates is configured along a length direction of the penholder.

By adopting the above technical solution, the arrangement of the reinforced plate increases the capacity of the outer wall of the penholder to withstand the external impact, reducing the deformation possibility of the outer wall of the penholder when external objects impact on the penholder.

Optionally, the penholder is configured as hollow, two ends of the penholder are both in communication with the external environment, an end of the knife box away from the knife opening is fixed with the inner wall of an end of the penholder in a plug-in manner, the inner wall of an end of the penholder away from the knife box is fixed with a mounting tube in a plug-in manner, the mounting tube has a shrunken opening, and the mounting tube is in communication with the inner chamber of the penholder.

By adopting the above technical solution, the penholder is used to accommodate a sponge core with ink. The mounting tube with the shrunken opening facilitates the clamping and fixing of the pen nib. The penholder is in communication with the mounting tube, facilitating the sponge core to supply the pen nib with ink.

Optionally, a plurality of limiting protrusions are fixed on the inner wall of the end of the mounting tube away from the knife box in homogeneous spacing, and the plurality of limiting protrusions are configured along the length direction of the mounting tube.

By adopting the above technical solution, the limiting protrusions clamp the pen nib to limit the rotation of the pen nib, so that the pen nib is more stable during signature of the operator, and the clamping of the pen nib is more stable.

Optionally, a pen cover is fixed with the outer wall of the mounting tube in a plug-in manner, a clamping plate is provided on an outer wall of the pen cover, and an abutting block is fixed on a side of the clamping plate facing the pen cover.

By adopting the above technical solution, the pen cover plays a protection role on the pen nib, reducing the dust that adhered on the pen nib. The arrangement of clamping plate is convenient for the operator to carry the marking pen. When carrying the marking pen, the collar is clamped between the clamping plate and the outer wall of the pen cover. The arrangement of the abutting block makes the clamping of the collar more stable, so that it is more stable to carry the marking pen.

Optionally, a connecting block is fixed with a side of the clamping plate facing the pen cover, an end of the connecting block away from the clamping plate is fixed with the outer wall of the pen cover, and a section area of the connecting block is configured as an arc shape.

By adopting the above technical solution, the connecting block connects the clamping block and the outer wall of the pen cover. The arc-shaped connecting block increases the strength of the connecting block, so as to increase the service life of the clamping plate.

Optionally, a plurality of antiskid grooves are defined on the outer wall of the pen cover in homogeneous spacing, and each of the plurality of antiskid grooves is arranged along a length direction of the pen cover.

By adopting the above technical solution, the arrangement of the antiskid grooves increases the friction between the finger of the operator and the outer wall of the pen cover, which facilitates separating the pen cover from the mounting tube.

Optionally, the sliding knife includes a knife end out of the knife box, the knife end includes an arc portion and a serration portion, the arc portion and the serration portion are respectively provided on two sides of the knife end, and a connection portion between the arc portion and the serration portion is configured as a sharp point.

By adopting the above technical solution, the sliding knife includes three function s of cutting, sawing and stabbing at the same time. The sliding knife is easier to unpack the package or the express sealing tape.

In summary, the present application includes at least one of the following beneficial technical effects.

1. The slidable is hidden in the knife box when it is unnecessary to use the sliding knife. When it is required to use the sliding knife, the driving member drives the driving rod to slide. The limiting block abuts against the outer wall of the driving rod when the sharp end of the sliding knife is slid out from the knife opening. The limiting blocks can limit the sliding of the driving rod, so that the cutting of the sliding knife is more stable.

2. The blocking block limits the sliding of the driving block when the blocking block abuts against the sidewall of the driving block, so as to limit the sliding of the driving rod, so that the cutting is more stable when the operator cuts the goods in the external environment.

DETAILED DESCRIPTION

The present application is further described in detail below in combination with FIGS. 1-6.

The embodiment of the present application discloses a marking pen with a unpacking knife.

Figure 1:
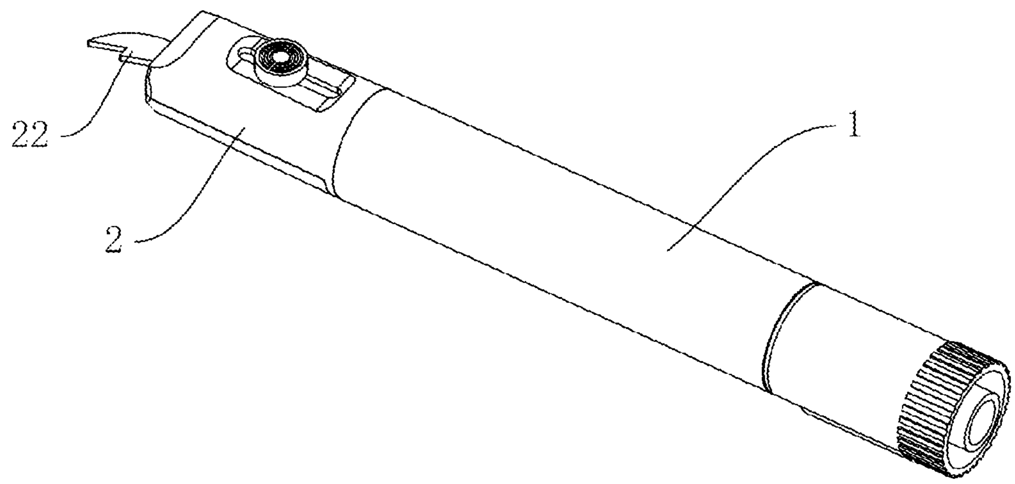
FIG. 1 is an overall structural schematic diagram of a marking pen in an embodiment of the present application.

Referring to FIG. 1, a marking pen with an unpacking knife includes a penholder 1 and a knife box 2 fixed with the penholder 1 in a plug-in manner. The end of the penholder 1 away from the knife box 2 is configured to fix the signature pen nib. The operator signs on the outer wall of the package by the end of the penholder 1 away from the knife box 2. A sliding knife 22 is slidably connected on the inner wall of the knife box 2. The operator cuts the goods to be cut in the external environment by the sliding knife 22 in the knife box 2.

Figure 3:
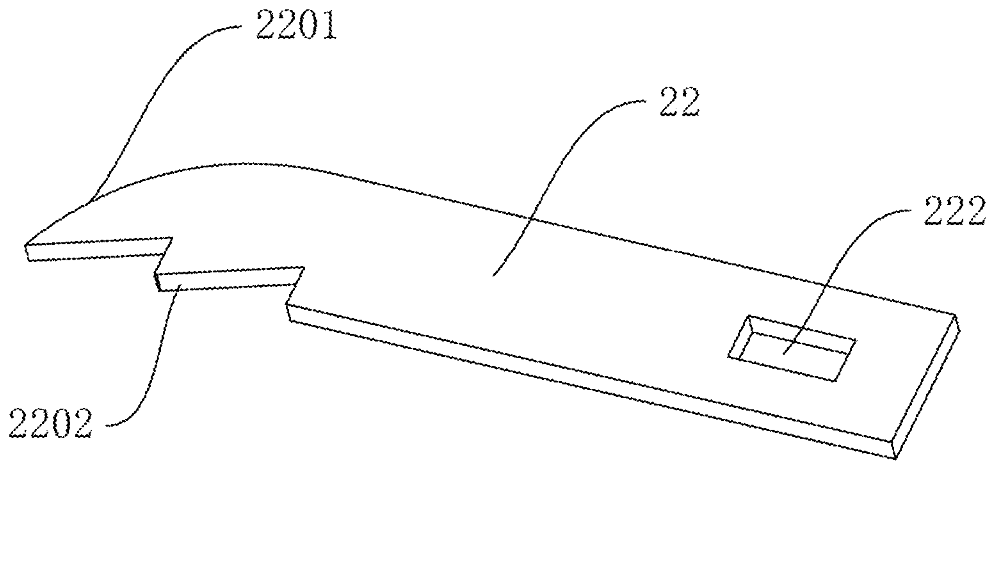
FIG. 3 is a structural schematic diagram of a sliding knife in the present application for indicating a mounting groove on a sidewall of a sliding knife.

Referring to FIG. 1 and FIG. 3, the sliding knife 22 includes a knife end out of the knife box 2. The knife end includes an arc portion 2201 and a serration portion 2202. The arc portion 2201 and the serration portion 2202 are respectively provided on two sides of the knife end. In this embodiment, the serration portion 2202 includes two triangle serrations. A connection portion between the arc portion 2201 and the serration portion 2202 is configured as a sharp point, so that the sliding knife 22 includes three functions of cutting, sawing and stabbing at the same time.

Figure 2:
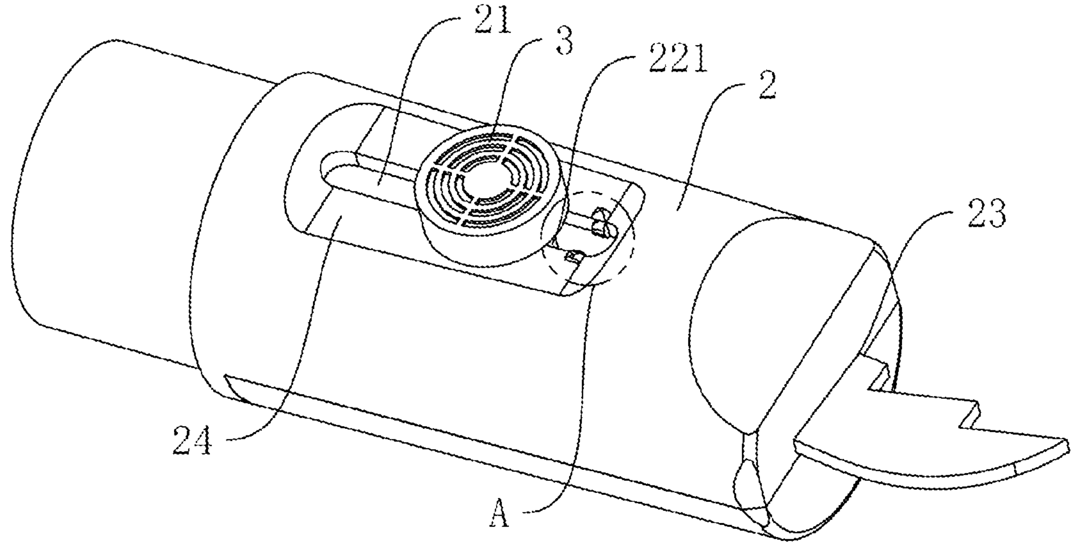
FIG. 2 is an overall structural schematic diagram of a portion where a knife box located in the present application.

Referring to FIG. 2 and FIG. 3, a knife opening 23 is defined on the end surface of the knife box 2. The knife opening 23 is in communication with the inner chamber of the knife box 2. A first sliding groove 21 is defined on the sidewall of the knife box 2 along the length direction. A mounting groove 222 is defined through the sidewall of the sliding knife 22. A driving rod 221 is fixed with the inner wall of the mounting groove 222 in a plug-in manner. The driving rod 221 is arranged to be perpendicular to the length direction of the sliding knife 22. The end of the driving rod 221 away from the sliding knife 22 is slidably connected in the first sliding groove 21. The operator drives the driving rod 221, so that the sliding knife 22 is slid in the knife box 2.

Figure 4:
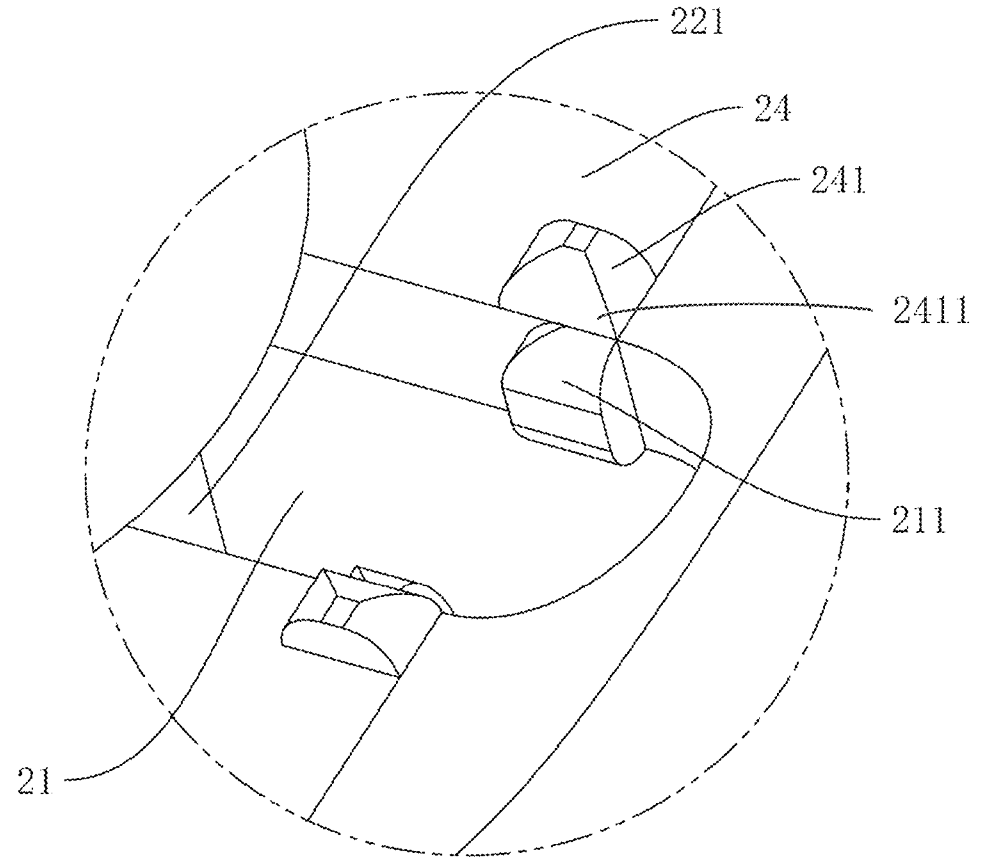
FIG. 4 is an enlarged diagram of portion A in FIG. 2.

Referring to FIG. 2 and FIG. 4, a limiting block 211 is fixed on the inner wall of the first sliding groove 21. Two limiting blocks 211 are provided in the present application. Two limiting blocks 211 are oppositely arranged. The limiting block 211 is positioned at the end of the first sliding groove 21 close to the knife opening 23. The operator pushes the driving rod 221, so that the sharp end of the sliding knife 22 is slid out from the knife opening 23. At this time, the outer wall of the driving rod 221 is slid passing by the limiting block 211, the driving rod 221 slides between two limiting blocks 211. An interference fit is formed between the driving rod 221 and the limiting block 211. The limiting block 211 limits the driving rod 221 from continued sliding, so that the cutting of the sliding knife 22 is more stable.

Referring to FIG. 2 and FIG. 3, a second sliding groove 24 is defined on the outer wall of the knife box 2 along the length direction thereof. A driving member for driving the driving rod 221 is provided in the second sliding groove 24. The driving member includes a driving block 3 that is slidably connected in the second sliding groove 24. The driving block 3 is integrated and fixed with the end of the driving rod 221 away from the sliding knife 22. The driving block 3 is connected to the inner wall of the first sliding groove 21 by an arc transition. The operator pushes the driving block 3 to drive the driving rod 221 to slide in the first sliding groove 21, so that the sliding knife 22 is slid in the knife box 2.

Referring to FIG. 4, the driving rod 221 is configured as an arc transition at the periphery along the thickness direction. The arc transition at the periphery of the driving rod 221 plays a guiding role on the sliding of the driving rod 221 when the driving rod 221 is slid to the limiting block 211, so as to make the sliding of the driving rod 221 easier.

Referring to FIG. 2 and FIG. 4, a blocking block 241 is fixed on an outer surface of the second sliding groove 24. Two blocking blocks 241 are provided in the present application. The outer wall of the blocking block 241 is configured as an arc transition. The operator pushed the driving block 3, so that the sharp end of the sliding knife 22 is slid out from the knife opening 23. At this time, the blocking block 241 abuts against the side of the driving block 3 facing the inner chamber of the knife box 2 to limit the sliding of the driving block 3, so that the operator can cut more stable.

Referring to FIG. 2 and FIG. 4, a spring (not shown in the figures) is provided in the second sliding groove 24. One end of the spring abuts against the driving rod 221, the other end abuts against the outer surface of the side of the second sliding groove 24 away from the knife opening 23. When the driving rod 221 is slid passing by the limiting block 211, the spring is in a stretched state, in which the length of the spring is larger than the length in a natural state thereof. When it is required to return the driving rod 221 to the original position after using the sliding knife 22, the driving block 3 is prodded, so that the driving rod 221 is driven to leave between two limiting blocks 211. After removing the force manually applied to the driving block 3, the driving rod 221 is elastically returned to the original position under the force of the spring to restore the elastic deformation.

Figure 5:
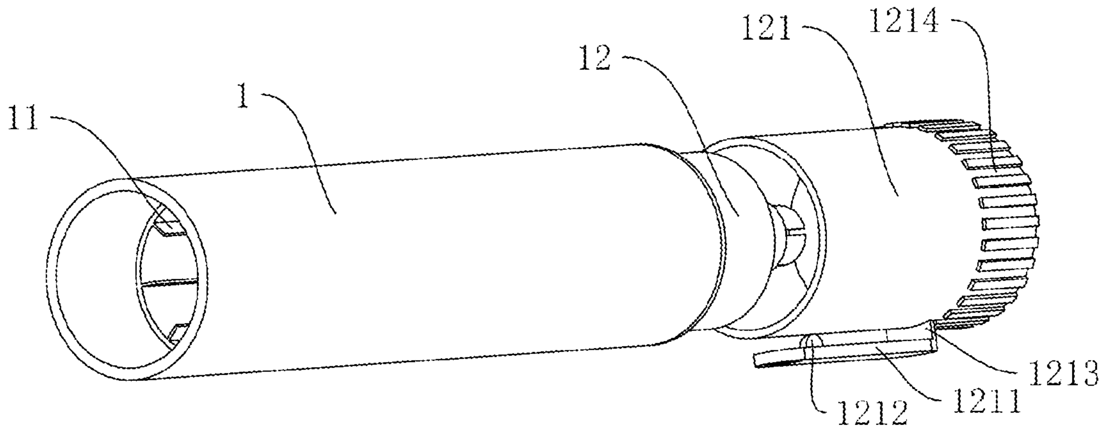
FIG. 5 is an explosion diagram of a pen cover in an embodiment of the present application.

Referring to FIG. 5, the penholder 1 is configured as hollow. Two ends of the penholder 1 are both in communication with the external environment. A plurality of reinforced plates 11 are integrated and fixed on the inner wall of the penholder 1. The reinforced plate 11 is provided along the length direction of the penholder 1. The arrangement of the reinforced plate 11 increases the strength of the cylinder-shaped penholder 1, so that the penholder 1 can withstand a stronger impact from outside.

Referring to FIG. 2 and FIG. 5, the opposite end of the knife box 2 relative to the end with the sliding knife 22 abuts against the reinforced plate 11 on the inner wall of the penholder 1 after inserting in the penholder 1. The plug-in end of the knife box 2 has a cylinder shape. The end of the knife box 2 is snapped in the penholder 1. When the operator pushes out the sliding knife 22, the finger applies the force on the driving block 3 to push out the sliding knife 22. The improper operation may cause the cylinder-shaped end of the knife box 2 separating from the penholder 1. By using a thread design, the knife box 2 is not easy to separate from the penholder 1, so that the pushing operation of the whole sliding knife 22 is safer, which is not easy to cause the accidental injury. Referring to FIG. 5, the inner chamber of the penholder 1 is configured to accommodate the ink sponge. A mounting tube 12 is fixed with the end of the penholder 1 away from the knife box 2. The mounting tube 12 has a shrunken opening. Two ends of the mounting tube 12 are both in communication with the external environment. The end of the mounting tube 12 away from the knife box 2 is configured to fix the pen nib. The ink sponge supplies the pen nib with ink. The operator holds the mounting tube 12, and sign on the outer wall of the package by the pen nib.

Referring to FIG. 2 and FIG. 5, the end of the knife box 2 that inserted in the penholder 1 is made of elastic material, such as elastic rubber. After inserting in the opening end of the penholder 1, the elastic end abuts against the inner wall of the penholder 1, so as to prevent the ink in the ink sponge inside the penholder 1 reversely osmoses into knife box 2.

The end surface of the knife box 2 made of the elastic rubber abuts against the end of the ink sponge, equivalent to blocking the ink at one end of the ink sponge, preventing the ink from osmosing from the end of the ink sponge close to the knife box 2, so as to reduce the waste and low utilization rate of ink.

Referring to FIG. 5, a pen cover 121 is sleeved on the outer wall of the mounting tube 12. The pen cover 121 has a cylinder shape. The inner chamber of the pen cover 121 is configured as hollow. A connecting block 1213 is integrated and fixed on the outer wall of the pen cover 121. The side of the connecting block 1213 facing the knife box 2 is configured as hollow. The end of the connecting block 1213 away from the pen cover 121 is fixed with a clamping plate 1211. The arrangement of the clamping plate 1211 is convenient to carry the marking pen.

Referring to FIG. 5, an abutting block 1212 is integrated and fixed with the side of the clamping plate 1211 facing the pen cover 121. The side of the abutting block 1212 away from the clamping plate 1211 is configured as arc. The arrangement of abutting block 1212 makes the carry of marking pen more stable, reducing the possibility that the clamping plate 1211 is separated from the connecting object.

Referring to FIG. 5, a plurality of antiskid grooves 1214 is defined on the outer wall of the pen cover 121 in homogeneous spacing. The antiskid groove 1214 is defined along the length direction of the pen cover 121. The arrangement of the antiskid groove 1214 greatly increases the friction between the finger of the operator and the outer wall of the pen cover 121, facilitating rotating the pen cover 121. It is convenient for the operator to pull off the pen cover 121 from the mounting tube 12.

Figure 6:
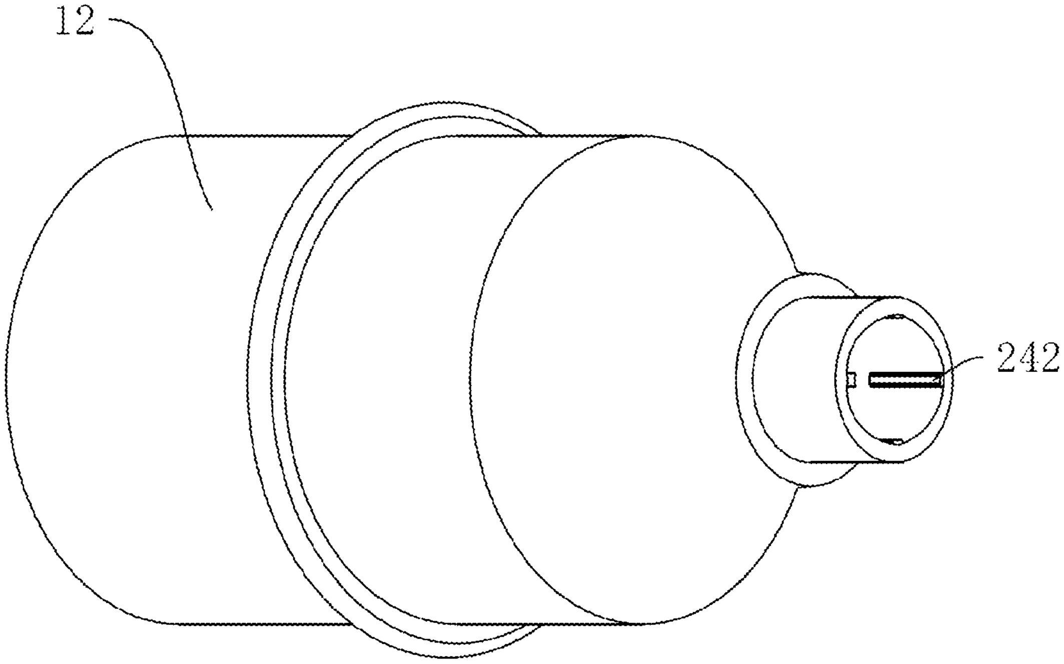
FIG. 6 is an overall structural schematic diagram of a mounting tube in an embodiment of the present application for indicating a limiting protrusion.

Referring to FIG. 2 and FIG. 6, a plurality of limiting protrusions 242 are integrated and fixed on the inner wall of the end of the mounting tube 12 away from the knife box 2. The outer wall of the limiting protrusion 242 is configure as an arc transition. The sidewall of the limiting protrusion 242 abuts against the outer wall of pen nib. The arrangement of the limiting protrusion 242 limits the rotation of the pen nib, reducing the rotating possibility of the pen nib during signature of the operator.

The implementation principle of the marking pen with an unpacking knife in the embodiment of the present application is: the operator rotates the pen cover 121, pulls off the pen cover 121 from the mounting tube 12 and signs on the outer wall of the package by using the pen nib in the mounting tube 12. When the operator needs to cut the tape or the package when enclosing the package, the driving block 3 is pushed to slide in the second sliding groove 24, so as to drive the driving rod 221 to slide in the first sliding groove 21, the sharp end of the sliding knife 22 is slide out from the knife opening 23. The limiting block 211 and the blocking block 241 limit the sliding of the driving rod 221 and the driving block 3, so as to make the sliding and cutting of the sliding knife 22 more stable.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1 penholder,
2 knife box,
21 first sliding groove,
22 sliding knife
2201 arc portion,
2202 serration portion,
221 driving rod,
222 mounting groove,
23 knife opening,
211 limiting block,
24 second sliding groove,
3 driving block,
241 blocking block,
2411 side portion,
11 reinforced plate,
12 mounting tube,
242 limiting protrusion,
121 pen cover,
1211 clamping plate,
1212 abutting block,
1213 connecting block,
1214 antiskid groove.

What is claimed is:

1. A marking pen with an unpacking knife comprising a penholder and a knife box fixed with the penholder, wherein a first sliding groove is defined on an outer wall of the knife box, a sliding knife is slidably connected in the knife box, a driving rod is fixed on a sidewall of the sliding knife, the driving rod is slidably connected in the first sliding groove, a knife opening is defined on the outer wall of the knife box, the knife opening is in communication with an inner chamber of the knife box, a limiting block is fixed on an inner wall of the first sliding groove, when the driving rod is slid to the limiting block, an outer wall of the limiting block abuts against an outer wall of the driving rod, and the knife box is provided with a driving member for driving the driving rod to slide, a first end of the penholder away from the knife box is fixed with a signature pen nib.

2. The marking pen with the unpacking knife according to claim 1, wherein a second sliding groove is defined on the outer wall of the knife box, the first sliding groove is provided in the second sliding groove, the driving member comprises a driving block fixed on an end of the driving rod away from the sliding knife, and the driving block is slidably connected in the second sliding groove.

3. The marking pen with the unpacking knife according to claim 2, wherein a blocking block is provided on an outer surface of the second sliding groove, and a side of the blocking block facing the first sliding groove is configured to abut against a sidewall of the driving block.

4. The marking pen with an unpacking knife according to claim 1, wherein a plurality of reinforced plates are fixed on an inner wall of the penholder in homogeneous spacing, and each of the plurality of reinforced plates is arranged along a length direction of the penholder.

5. The marking pen with the unpacking knife according to claim 1, wherein the penholder is hollow, two ends of the penholder are both in communication with an external environment, an end of the knife box away from the knife opening is fixed with an inner wall of a second end of the penholder in a plug-in manner, an inner wall of the first end of the penholder away from the knife box is fixed with a mounting tube in a plug-in manner, the mounting tube has a shrunken opening, the mounting tube is in communication with an inner chamber of the penholder, the penholder is configured to accommodate a sponge core with ink, the end of the knife box inserted in the penholder is made of elastic material, and an end surface of the knife box made of the elastic material abuts against an end of the sponge core.

6. The marking pen with the unpacking knife according to claim 5, wherein a plurality of limiting protrusions are fixed on an inner wall of an end of the mounting tube away from the knife box in homogeneous spacing, and the plurality of limiting protrusions are arranged along a length direction of the mounting tube.

7. The marking pen with the unpacking knife according to claim 6, wherein a pen cover is fixed with an outer wall of the mounting tube in a plug-in manner, a clamping plate is spaced from an outer wall of the pen cover, and an abutting block is fixed on a side of the clamping plate facing the pen cover.

8. The marking pen with the unpacking knife according to claim 7, wherein a connecting block is fixed with the side of the clamping plate facing the pen cover, an end of the connecting block away from the clamping plate is fixed with the outer wall of the pen cover, and a side of the abutting block away from the clamping plate is configured as an arc.

9. The marking pen with the unpacking knife according to claim 8, wherein a plurality of antiskid grooves are defined on the outer wall of the pen cover in homogeneous spacing, and each of the plurality of antiskid grooves is arranged along a length direction of the pen cover.

10. The marking pen with the unpacking knife according to claim 1, wherein the sliding knife comprises a knife end slidable out of the knife box, the knife end comprises an arc portion and a serration portion, the arc portion and the serration portion are respectively provided on two sides of the knife end, and a connection portion between the arc portion and the serration portion is configured as a sharp point.

* * * * *